3,027,799
SAMPLE SPACE ADAPTERS FOR SPECTRO-
PHOTOMETERS AND THE LIKE
Theodore E. Weichselbaum, Normandy, Mo., assignor, by mesne assignments, to Brunswick Corporation, Chicago, Ill., a corporation of Delaware
Filed Jan. 26, 1959, Ser. No. 788,810
8 Claims. (Cl. 88—14)

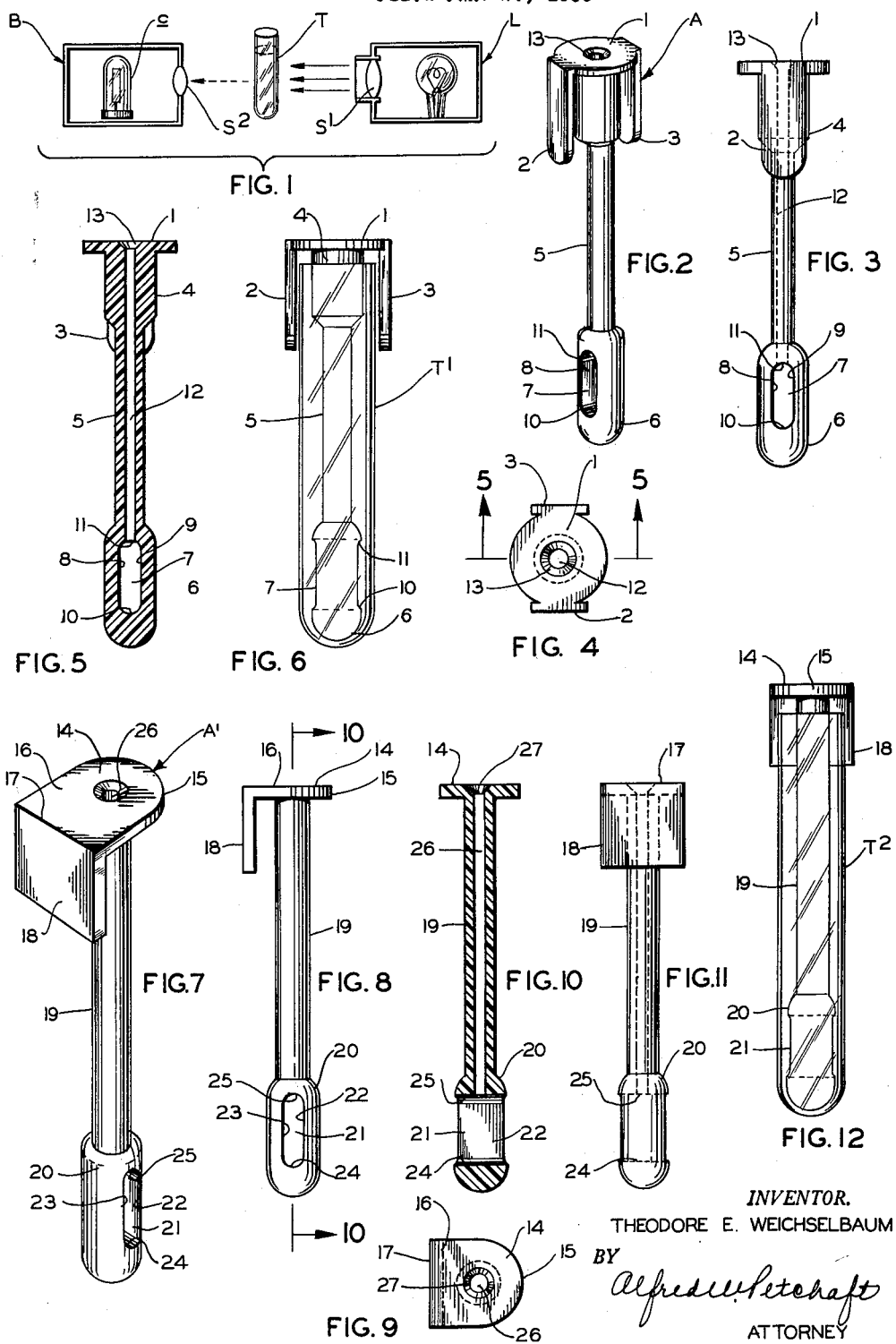
April 3, 1962 — T. E. WEICHSELBAUM — 3,027,799
SAMPLE SPACE ADAPTERS FOR SPECTROPHOTOMETERS AND THE LIKE
Filed Jan. 26, 1959
INVENTOR.
THEODORE E. WEICHSELBAUM
BY
ATTORNEY United States Patent Office 3,027,799
Patented Apr. 3, 1962

This invention relates in general to spectrophotometers and, more particularly, to a sample space adapter.

In qualitative and quantitative analysis increasing use is being made of spectrophotometric and optical methods and, in the interest of obtaining accurate results, extremely precise and extensive electro-optical and optical devices are employed. In most equipment of this type, a beam of light is passed through a glass tube containing a solution of the sample to be analyzed and the degree of optical change in the beam of light as it passes through the sample is measured in one way or another. Usually, the beam of light is monochromatic and of carefully controlled intensity. In some types of analytical work, the beam of light is split by prisms into equal parallel beams which are directed through two glass tubes, one containing the sample and one containing a standard solution of known optical characteristics, so that the sample can be analyzed comparatively with respect to the standard. It will, of course, be evident that one of the critical elements in all apparatus of this type is the glass sample tube or cuvette. Not only must the glass be of known optical properties, but the wall thickness, inside diameter, outside diameter, or the dimensions must be accurate within very precise limits. Moreover, the apparatus must be accurately calibrated in relation to the sample tubes or cuvettes which must be used therewith. Such glass sample tubes or cuvettes, for existing types of spectrophotometric and optical devices, are relatively large, being the order of one centimeter or more in inside diametral size and having a volumetric capacity of the order of four or five cubic centimeters. In fact, many glass sample tubes or cuvettes are much larger in size. Consequently, a substantial quantity of the sample which is to be analyzed must be available in order to fill the sample tube or cuvette to a sufficient level so that an optical or spectrophotometric analysis can be made.

The relatively large size of sample required for spectrophotometric and optical methods of analysis has materially inhibited the application of such methods to the analysis of biological fluids, such as blood samples, and the like, inasmuch as the quantity of biological fluid available for analysis is usually small. In many cases, it is impossible, or at least highly undesirable, to withdraw more than a few milliliters of a biological fluid from the patient for analytical purposes. Undoubtedly, it would be possible to construct a spectrophotometric or optical instrument with an appropriately designed lens system and extremely small sample tubes or cuvettes so that micro-techniques could be employed rather than the macro-techniques now currently in use. Such an approach to the problem, however, would have obvious disadvantages inasmuch as existing spectrophotometric and optical equipment is extremely expensive and newly designed equipment would be even more expensive. Moreover, the percentage of error which is inherent in optical procedures would introduce serious and very critical problems into the re-designing of such equipment for minute samples. It is obvious, therefore, that there is a need for adapting present types of spectrophotometric and optical equipment so that small-scale samples can be effectively analyzed.

It is, therefore, the primary object of the present invention to provide a sample space adapter which can be used with existing types of sample tubes or cuvettes for spectrophotometric and optical analytical apparatus in order that such sample tubes or cuvettes can be adapted for comparatively small sized samples.

It is another object of the present invention to provide a sample space adapter of the type stated which is extremely accurate in its physical dimensions and, when used with spectrophotometric and optical analytical equipment, will not reduce the degree of accuracy thereof.

It is another object of the present invention to provide a sample space adapter of the type stated which can be manufactured simply and economically to extremely rigid tolerances of accuracy.

It is also an object of the present invention to provide a sample space adapter of the type stated which is simple in operation and will not, in any way, complicate or interfere with analytical methods employing spectrophotometric and optical equipment.

It is a further object of the present invention to provide a sample space adapter of the type stated which is not adversely affected by the various liquids ordinarily encountered in spectrophotometric and optical analytical procedures and can be readily cleaned after each use so as to be available for re-use.

With the above and other objects in view, my invention resides in the novel features of form, construction, arrangement, and combination of parts presently described and pointed out in the claims.

In the accompanying drawings—

FIG. 1 is a diagrammatic illustration of a spectrophotometer merely showing, in a schematic manner, the component elements in such a device;

FIG. 2 is a perspective view of a sample space adapter constructed in accordance with and embodying the present invention;

FIG. 3 is a side elevational view of the sample space adapter;

FIG. 4 is a top plan view of the sample space adapter;

FIG. 5 is a vertical sectional view taken along line 5—5 of FIG. 4;

FIG. 6 is a front elevational view of a sample tube or cuvette having a sample space adapter of the present invention inserted in operative position therein;

FIG. 7 is a perspective view of a modified form of sample space adapter constructed in accordance with and embodying the present invention;

FIG. 8 is a side elevational view of the modified form of sample space adapter;

FIG. 9 is a top plan view of the modified form of sample space adapter;

FIG. 10 is a rear elevational view of the modified form of sample space adapter;

FIG. 11 is a vertical sectional view taken along line 11—11 of FIG. 8; and

FIG. 12 is a front elevational view of a sample tube or cuvette with the modified form of sample space adapter disposed in operative position therein.

As has been previously pointed out, there are various types of spectrophotometric and optical analytical devices, but, in the main, all this type of equipment operates upon the same general principle, in that a dilute solution of a sample is placed within a sample tube or cuvette and disposed in the path of a beam of light. The spectrophotometric system shown diagrammatically in FIG. 1 is substantially representative of most types of spectrophotometric equipment, and in broadest terms, consists of a light source L and a light-recording or light-analyzing unit B, which contains a photoelectric cell c. Ordinarily the light source L and the light-recording unit B are equipped with suitable lens-systems $S^1$, $S^2$, so that the light will follow a predetermined path. It also should be noted in this connection that the light source L and light-recording unit B are provided with electrical and electronic circuitry which is more or less complicated, but no effort has been made herein to show or discuss such circuitry, since, for purposes of the present invention, such circuitry is entirely conventional. Suitably interposed between the light source L and the light-recording unit B is a sample tube or cuvette T which is made of glass having known or predetermined optical characteristics and quite precise dimensions. The sample to be analyzed is placed in the tube T and the amount of optical change effected in the light beam is measured. In most types of spectrophotometric equipment, the amount of light absorbed by the sample is measured in accordance with Beer's law. In other types of equipment, colorimetric variations and changes may be noted and measured or recorded in one way or another. For purposes of the present invention, it is merely sufficient to note that the glass sample tube or cuvette T must be filled with a sufficient quantity of sample, so that a beam of light of known cross-sectional area will pass through the liquid sample for a predetermined distance. The present invention relates to sample space adapters adapted for use with sample tubes or cuvettes of the type and size generally available and in use at the present time.

As shown in FIG. 2, A designates a sample space adapter molded as a one-piece unit preferably from polyethylene or other synthetic plastics such as a fluor-carbon polymer. The sample space adapter A integrally includes a circular top disk 1 having an external diametral size substantially greater than the outside diametral size of the sample tube or cuvette $T^1$ with which it is to be used. Formed integrally with the top disk 1 along diametrally opposed portions of the periphery thereof and extending axially downwardly therefrom are flat plate-like tabs 2, 3, which are adapted to fit within locating elements formed as a standard part of the spectrophotometer in which the sample tube or cuvette $T^1$ will fit.

Formed integrally with, and extending coaxially downwardly from, the under face of the top disk 1 is a cylindrical plug 4, which fits snugly within the upper end of the sample tube or cuvette $T^1$ and at its lower end merges integrally with a diametrally reduced rod-like shank 5, which, in turn, extends axially downwardly through the sample tube or cuvette $T^1$ and is, in turn, integrally provided at its lower end with an enlarged, somewhat bulbous terminal portion 6. As will be seen by reference to FIG. 6, the terminal portion 6 is of substantially the same size and shape as the lower end of the sample tube or cuvette $T^1$ and the over-all length of the sample space adapter A is such that the terminal portion 6 will rest upon the bottom of the sample tube or cuvette $T^1$ substantially in the manner shown in FIG. 6.

Formed in and extending diametrally through the terminal portion 6 is an elliptical passageway or slot 7 which is relatively long in the vertical direction and has flat parallel side walls 8, 9, and semicircular bottom and top walls 10, 11, respectively. Extending axially through the plug member 4 and shank 5 is a small-diameter bore 12 which opens downwardly upon the semicircular face 9 of the slot 7 and similarly opens at its upper end into a somewhat enlarged, tapered mouth 13, the latter opening upwardly upon the upper flat face of the top disk 1.

The sample tube or cuvette $T^1$ is of the type which ordinarily requires a sample of approximately six to eight milliliters in volume. However, when used with the sample space adapter A, it is possible to place one and a half of two milliliters of sample in the bottom of the sample tube or cuvette $T^1$ and then insert the sample space adapter A in the position shown in FIG. 6. The bulbous terminal portion 6 will, in effect, displace the liquid sample, causing it to flow upwardly and fill the slot 7. Any air or air-bubbles which may be entrained or trapped by the insertion of the sample space adapter A will flow upwardly into the slot 7 and out through the bore 12, so that the entire slot will be filled with the sample. The slot 7, moreover, is located in such position that the light beam will pass through the liquid held within the slot 7. It will, of course, be understood that the slot 7 is of such cross-sectional shape in dimensions as to avoid any interference with the light beam.

Is is also possible to provide a modified form of sample space adapter $A^1$, as shown in FIGS. 7 to 12, inclusive, comprising a top disk 14 having a semicircular forward margin 15 and a rearwardly extending back-flange 16 terminating in a straight transverse margin 17 and an integrally formed downwardly extending rectangular tab 18, the latter being designed for positioning engagement with suitable elements on a spectrophotometer for which the sample space adapter $A^1$ is designed. Formed integrally with, and extending downwardly from, the under face of the top disk 14 is a cylindrical or rod-like shank 19 which is, in turn, integrally joined to a bulbous terminal portion 20 having a transversely extending slot 21. The bulbous terminal portion 20 is shaped to fit snugly within the bottom of a sample tube or cuvette $T^2$, as shown in FIG. 12. The slot 21 is of elongated, generally elliptical cross-sectional shape and is defined by two straight parallel side walls 22, 23, joined by somewhat semicircular bottom and top walls 24, 25, respectively. Extending axially through the shank 19 is a small-diameter bore 26 which opens at its lower end upon the top wall 25 of the slot 21 and opens at its upper end into a diametrally enlarged, somewhat conical mouth 27, which, in turn, opens upon the upwardly presented flat surface of the top disk 14.

In use, the sample space adapter $A^1$ is inserted into the sample tube or cuvette $T^2$, as shown in FIG. 12, and achieves functions exactly in the same manner as the previously described sample space adapter A. In this connection, it should be noted that the sample space adapter $A^1$ is molded or otherwise fabricated from polyethylene or other synthetic resin, such as a fluor-carbon polymer.

It should be understood that changes and modifications in the form, construction, arrangement, and combination of the several parts of the sample space adapters for spectrophotometers and the like may be made and substituted for those herein shown and described without departing from the nature and principle of my invention.

Having thus described my invention, what I claim and desire to secure by Letters Patent is:

1. A sample space adapter for use with spectrophotometric sample tubes, cuvettes and the like; said sample space adapter comprising a shank adapted to fit loosely into the sample tube, and an enlarged terminal portion on the end of the shank, said terminal portion being sized slightly smaller than the internal diameter of the sample tube and also being provided with a transverse opening to allow passage of light from side to side through the sample tube, said shank being provided with an elongated air vent communicating with said transverse opening for removing entrapped air therefrom.

2. A sample space adapter for use with a spectrophotometer which analyzes solutions by detecting changes in a beam of light rays which is passed through various samples of said solutions contained in spectrophotometric sample tubes, cuvettes and the like; said sample space adapter comprising a shank adapted to fit loosely into the sample tube, an enlarged terminal portion formed integrally on the end of the shank and being sized and shaped for substantially filling the inner bottom of the sample tube when disposed therein, said terminal portion being provided with a transverse opening to allow passage of light from side to side through the sample tube, said shank being provided with an elongated air vent communicating with said transverse opening for removing entrapped air therefrom, and positioning means for locating the adapter and tube with respect to the beam of light rays analyzed by the spectrophotometer.

3. The device of claim 2 wherein the positioning means is integrally connected to the shank and includes an upper plug-like element adapted to fit within the upper end of the sample tube and an upper disk having a flat top.

4. The device of claim 2 wherein the positioning means is integrally connected to the shank and includes an upper plug-like element adapted to fit within the upper end of the sample tube and an upper disk having a flat top, and the positioning means also includes a depending locator tab integrally formed on a side of the disk.

5. The device of claim 2 wherein the positioning means is integrally connected to the shank and includes an upper plug-like element adapted to fit within the upper end of the sample tube and an upper disk having a flat top, and the positioning means also includes a pair of depending locator tabs integrally formed on opposite sides of the disk.

6. A sample space adapter for use with spectrophotometric sample tubes, said sample space adapter comprising a shank having an upper and a lower end and adapted to fit loosely into the sample tube, a closure-plug formed in the upper end of the shank, said plug having a top element which is diametrally larger than the sample tube, an enlarged terminal portion on the lower end of the shank, said terminal portion being sized slightly smaller than the internal diameter of the sample tube and also being provided with a transverse opening to allow passage of light from side-to-side through the sample tube, and means for removing entrapped air from the confines of the transverse opening when a solution is placed in the sample tube.

7. A sample space adapter for use with spectrometer which analyzes solutions by detecting changes in a beam of light rays which is passed through various samples of said solution contained in spectrometric sample tubes, said sample space adapter comprising a shank having an upper and a lower end and adapted to fit loosely into the sample tube, a closure-plug formed on the upper end of the shank, said plug having a top element which is diametrally larger than the sample tube, an enlarged terminal portion formed integrally on the end of the shank and being sized and shaped for substantially filling the inner bottom of the sample tube when disposed therein, said terminal portion being provided with a transverse opening to allow passage of light from side-to-side through the sample tube, means for removing entrapped air from the confines of the transverse opening when a solution is placed in the sample tube, and positioning means for locating the adapter and tube with respect to the beam of light rays analyzed by the spectrophotometer.

8. A sample space adapter for use with a spectrophotometer which analyzes solutions by detecting changes in a beam of light rays which is passed through various samples of said solutions contained in spectrophotometric sample tubes, said sample space adapter comprising a shank having an upper and a lower end and adapted to fit loosely into the sample tube, a closure-plug formed in the upper end of the shank, said plug having a top element which is diametrally larger than the sample tube, an enlarged terminal portion on the end of the shank and being sized and shaped for substantially filling the inner bottom of the sample tube when disposed therein, said terminal portion being provided with a transverse opening which is of larger dimension than the cross-section of the beam of light rays to allow unobstructed passage of the beam of light rays from side-to-side through the sample tube, said shank being provided with an elongated air vent communicating with said transverse opening for removing entrapped air therefrom, and positioning means for locating the sample tube and adapted with respect to the spectrophotometer in such manner that the opening is centrally aligned with respect to the beam of light rays whereby the light rays may pass unobstructed through the tube and the opening.

References Cited in the file of this patent

UNITED STATES PATENTS

| | | |
|---|---|---|
| 2,091,222 | Thomas | Aug. 24, 1937 |
| 2,193,315 | Evelyn | Mar. 12, 1940 |
| 2,896,502 | Nordin | July 28, 1959 |
| 2,912,895 | Hamilton | Nov. 17, 1959 |